C. W. SHIELDS.
EGG BOILER.
APPLICATION FILED JAN. 30, 1914.
1,159,537.
Patented Nov. 9, 1915.
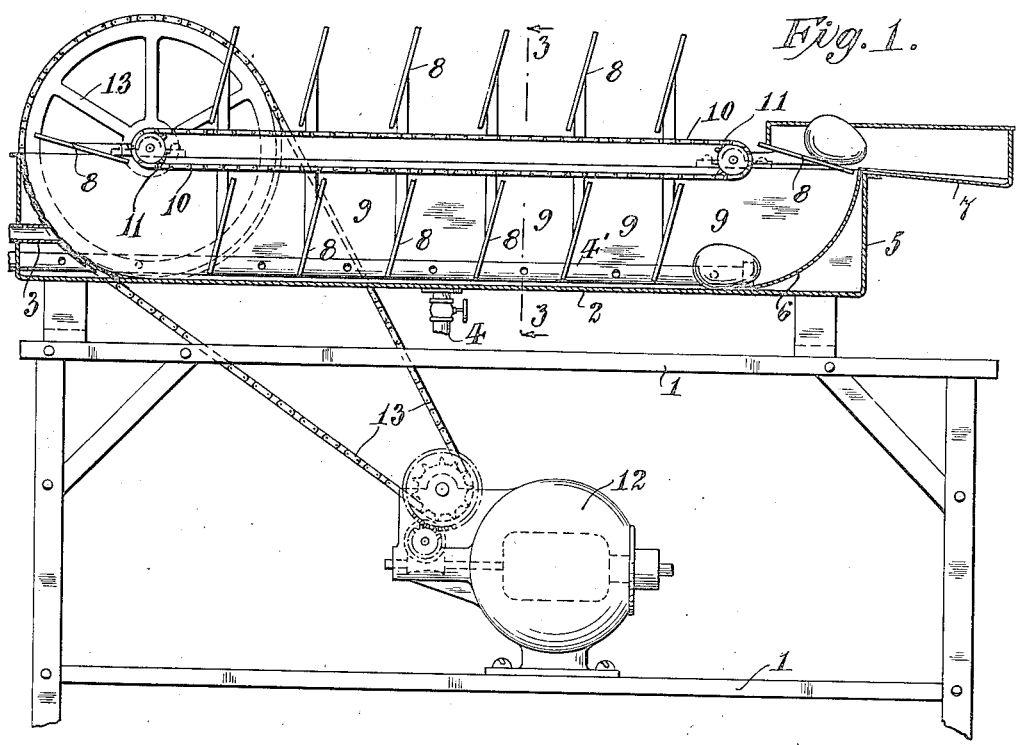
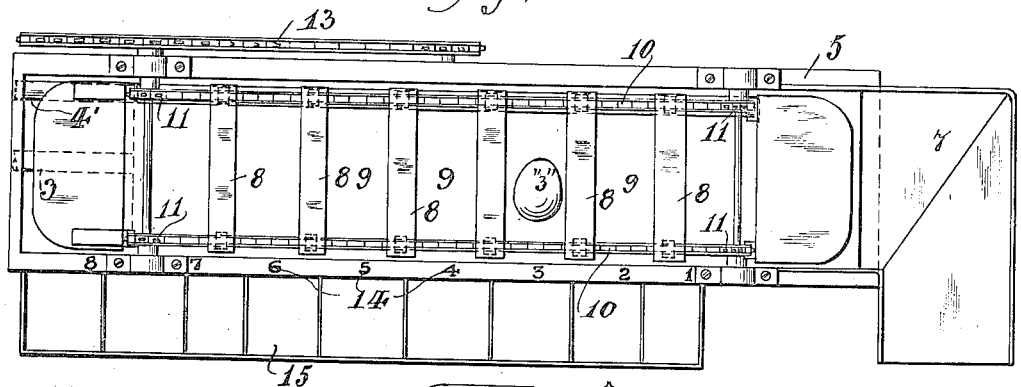
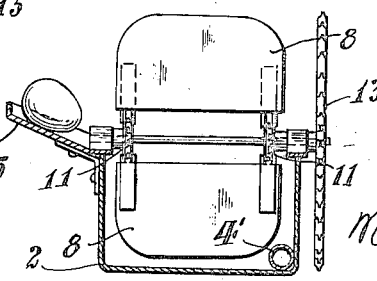
WITNESSES:
INVENTOR
Curtis W. Shields
BY
Messimer & Austin
ATTORNEYS

UNITED STATES PATENT OFFICE.

CURTIS W. SHIELDS, OF NEW YORK, N. Y.

EGG-BOILER.

1,159,537. Specification of Letters Patent. Patented Nov. 9, 1915.

Application filed January 30, 1914. Serial No. 815,458.

*To all whom it may concern:*

Be it known that I, CURTIS W. SHIELDS, a citizen of the United States, residing in the city of New York, county of Kings, and State of New York, have invented certain new and useful Improvements in Egg-Boilers, of which the following is a specification.

My invention relates to a time regulated culinary utensil particularly designed to be used as an egg boiler and an object of the invention is to provide a device in which eggs or similar articles may be placed at any time, irrespective of the presence of other eggs therein, and subjected to a boiling or other cooking action for any desired interval of time. Accordingly I provide a receptacle adapted to contain a heating liquid, such as boiling water, in which eggs, marked for identification, may be placed at different distances from a delivery end and are moved through the boiling liquid toward said end for a time depending upon the distance to be traversed; after which they are automatically removed from the boiling liquid.
The various other objects of the invention will be more fully set forth in the following description of one form of mechanism embodying the invention which consists in the new and novel features of construction and combination of parts hereinafter set forth and claimed.

Referring to the accompanying drawings:—Figure 1 is a side elevation of one form of my invention with parts thereof shown in longitudinal section, Fig. 2 is a plan view of the device shown in Fig. 1; and Fig. 3 is a transverse sectional view taken on the line 3—3 of Fig. 1 looking in the direction indicated by the arrows.
In the drawings is shown a suitable stand 1, upon which is mounted an open top receptacle 2, providing ready access to any part of the same and adapted to contain water, which may be boiling water fed to the same through an inlet pipe 3 and withdrawn therefrom through an outlet pipe 4 or the water therein may be heated by any suitable means, such as steam from the perforated steam pipe 4', the perforations of which are spaced apart preferably a distance not greater than the length of the egg containing compartments.

One end 5 of the receptacle constitutes a delivery end and the bottom 6 of the receptacle adjacent this end gradually curves upward to a delivery chute 7. A series of vertically inclined partitions 8 extend across the receptacle slightly above the bottom to form a number of open top egg containing compartments 9 within the boiling water. These partitions are arranged to move at a uniform rate of speed toward the delivery end of the receptacle and are mounted, preferably on an endless conveyer 10 passing over sprocket wheels 11 mounted adjacent opposite ends of the receptacle. A motor 12 acts through a chain and sprocket connection 13 to drive the conveyer at the desired rate of travel and a chute 15 for the eggs is positioned on the side of the receptacle.

In operation, with the parts in the position shown and the conveyer traveling at a uniform rate, as for instance, a time interval of one minute to traverse toward the delivery end, a distance equal to the distance between succeeding partitions, the eggs, or other articles, are given some identification mark, such as the number of minutes they are to remain in the boiling water, and are then placed in that compartment 9, which will remain in the boiling water for this desired time.

For convenience in identifying the different compartments, the portion of the receptacle traversed by the partitions may bear characters 14 indicative of the time during which the eggs remain in the water when traveling from the portion indicated to the delivery end, for instance, should a three-minute egg be desired it may be marked with a "3" and dropped into the receptacle opposite the space marked "3" and the egg will be removed automatically from the water and placed on the chute at the end of the third minute.

The partitions move through the water pushing the eggs before them along the bottom 6 and up the inclined end portion thereof onto the chute 7 from which they may be assorted by means of their identification marks.

By means of a device of this character it is possible to introduce the eggs at any time without waiting for the delivery of eggs already in the device, the added eggs being merely dropped into the appropriate compartment and afterward separated from the eggs on the delivery chute by means of their identification mark.

The device is simple in construction; may be readily cleaned in all its parts and is entirely automatic in its operation. The time intervals for the movements of the eggs may be readily changed by varying either the relation of the sprockets in the chain and sprocket connection 13 or the speed of the motor may be changed or varied by any of the well known motor speed controlling devices.

Although I have shown only one form of mechanism embodying my invention, it is obvious that various changes within the skill of the mechanic may be made therein without departing from the spirit of the invention, provided the means set forth in the following claims are employed.

Having thus described my invention, what I claim and desire to protect by United States Letters Patent is:

1. An egg boiler comprising an open top receptacle adapted to contain a heating liquid and having a delivery chute at one end, a pair of sprocket wheels adjacent opposite ends, an endless conveyer passing about said sprocket wheels, a plurality of compartment forming partitions carried by said conveyer and passing in one direction through said liquid toward said chute adapted to elevate the eggs carried in the compartments out of the heating liquid and into the chute and means for driving said conveyer at a uniform rate of speed.

2. An egg boiler comprising an open top receptacle having a delivery end and adapted to contain a heating liquid, an endless conveyer having spaced partitions forming open top egg containing compartments movable through said liquid and accessible at all times, means adapted to receive the eggs from the liquid at the delivery end of the receptacle and means for driving said endless conveyer.

3. An egg boiler comprising a receptacle having a delivery end and adapted to contain a heating liquid, an egg carrying member disposed within said liquid for a definite time and means for removing said member from the liquid at the end of said time, said member being continually accessible while in said liquid and movable in the liquid at a definite rate toward said delivery end whereby eggs may be introduced therein at any time and at different distances from the delivery end thereby to regulate the time that the eggs are subjected to the action of the heating liquid.

4. An egg boiler comprising a heating receptacle having a delivery end, a plurality of compartment forming members movable at a uniform rate through said receptacle toward said end, said receptacle having means providing access to each of said compartments, whereby the eggs can be placed in any desired compartment to remain in the receptacle for a time depending upon the position, relative to the delivery end, of the compartment when the eggs were placed therein.

5. An egg boiler comprising a receptacle adapted to contain a heating liquid and having a delivery end, said receptacle designed to have eggs placed therein at different distances from said delivery end means for moving the eggs through the heating liquid at a definite rate toward said delivery end for a length of time proportionate to the distance from the delivery end and means coacting with said moving means for ejecting the eggs automatically from the heating liquid at the delivery end of the receptacle.

6. A cooking utensil comprising a receptacle adapted to contain a heating liquid, a series of compartment forming members movable through and from said liquid and means for moving succeeding members from said liquid at the end of succeeding intervals of time whereby the contents of succeeding compartments are successively removed from the heating liquid.

7. An egg boiler comprising a receptacle adapted to contain a heating fluid, means for moving eggs through said receptacle a predetermined distance per unit of time and for automatically discharging all eggs from the receptacle at a given point irrespective of the distance the eggs have traveled through the receptacle, said receptacle being adapted to receive eggs and subject them to the propulsion of the moving means at distances from the discharge point corresponding to predetermined intervals of time.

8. An egg boiler comprising a heating receptacle having a delivery end, a plurality of compartment forming members movable at a uniform rate through said receptacle toward said end, said receptacle having means providing access to each of said compartments, whereby the eggs can be placed in any desired compartment to remain in the receptacle for a time depending upon the position, relative to the delivery end, of the compartment when the eggs were placed therein and means for heating each of said compartments.

9. A cooking utensil comprising a receptacle adapted to contain a heating liquid, a series of equally spaced compartment forming members movable through said liquid, a steam pipe having a plurality of outlets to the liquid spaced apart a distance not greater than the length of the compartments whereby each compartment will have a stem outlet thereto.

This specification signed and witnessed this 28th day of January, A. D., 1914.

CURTIS W. SHIELDS.

Witnesses:
   HAROLD L. WETTENBEVE,
   J. B. CROFTS.